United States Patent
Tian et al.

(10) Patent No.: US 8,295,012 B1
(45) Date of Patent: Oct. 23, 2012

(54) DISK DRIVE SUSPENSION ASSEMBLY WITH ROTARY FINE ACTUATOR AT FLEXURE TONGUE

(75) Inventors: Jifang Tian, Fremont, CA (US); Qiang Yang, Fremont, CA (US); Jian Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/159,598

(22) Filed: Jun. 14, 2011

(51) Int. Cl.
*G11B 21/16* (2006.01)
(52) U.S. Cl. ................................................... 360/245.4
(58) Field of Classification Search ........... 360/245.4, 360/234.5, 294, 294.4, 245, 245.7, 245.9, 360/244.2, 245.2, 244.3, 234.6, 244.5; 29/603.03, 29/603.06, 603.02
See application file for complete search history.

(56) References Cited

U.S. PATENT DOCUMENTS

| | | | |
|---|---|---|---|
| 5,465,186 A * | 11/1995 | Bajorek et al. ............... | 360/323 |
| 5,894,651 A | 4/1999 | Dvorsky et al. | |
| 5,920,145 A | 7/1999 | Wu et al. | |
| 5,920,978 A | 7/1999 | Koshikawa et al. | |
| 6,052,879 A | 4/2000 | Wu et al. | |
| 6,262,869 B1 * | 7/2001 | Lin et al. .................. | 360/324.11 |
| 6,291,930 B1 | 9/2001 | Sager | |
| 6,320,730 B1 | 11/2001 | Stefansky et al. | |
| 6,351,352 B1 * | 2/2002 | Khan et al. ................. | 360/264.2 |
| 6,351,353 B1 | 2/2002 | Sluzewski et al. | |
| 6,351,354 B1 | 2/2002 | Bonin | |
| 6,487,045 B1 | 11/2002 | Yanagisawa | |
| 6,501,625 B1 | 12/2002 | Boismier et al. | |
| 6,570,730 B1 | 5/2003 | Lewis et al. | |
| 6,624,984 B2 | 9/2003 | Lewis et al. | |
| 6,661,619 B2 | 12/2003 | Nishida et al. | |
| 6,760,196 B1 | 7/2004 | Niu et al. | |
| 6,807,030 B1 | 10/2004 | Hawwa et al. | |
| 6,870,709 B2 | 3/2005 | Shimanouchi et al. | |
| 6,883,215 B2 | 4/2005 | Takeuchi et al. | |
| 6,928,722 B2 | 8/2005 | Yanagisawa | |
| 6,961,221 B1 | 11/2005 | Niu et al. | |
| 7,023,663 B2 | 4/2006 | Yao et al. | |
| 7,057,857 B1 | 6/2006 | Niu et al. | |
| 7,057,858 B2 | 6/2006 | Pan et al. | |
| 7,072,149 B2 | 7/2006 | Kuwajima et al. | |
| 7,082,671 B2 | 8/2006 | Yanagisawa | |
| 7,151,650 B2 | 12/2006 | Lee | |
| 7,159,300 B2 | 1/2007 | Yao et al. | |
| 7,248,444 B1 * | 7/2007 | Lauer ......................... | 360/294.4 |

(Continued)

OTHER PUBLICATIONS

Kuwajima et al., "Thin-Film Piezoelectric DSA for HDD", IEEE Trans. Magn., vol. 38, No. 5, Sep. 2002, pp. 2186-2188.

(Continued)

*Primary Examiner* — Allen Cao

(57) ABSTRACT

A head gimbal assembly includes a rotary fine actuator attached to the head mounting tongue. The rotary fine actuator includes a fixed portion, a head mounting platform, first and second piezoelectric elements, and first and second curved compliant members. The first piezoelectric element is bonded to the fixed portion at a first bonding surface, and to the head mounting platform at a second bonding surface. The second piezoelectric element extends between the fixed portion and the head mounting platform. The first and second curved compliant members extend between the fixed portion and the head mounting platform. A read head is bonded to a mounting surface of the head mounting platform. The first and second bonding surfaces are parallel to the mounting surface. The read head is disposed between the first and second piezoelectric elements.

20 Claims, 8 Drawing Sheets

U.S. PATENT DOCUMENTS

| | | |
|---|---|---|
| 7,277,257 B2 | 10/2007 | Hipwell, Jr. et al. |
| 7,280,319 B1 | 10/2007 | McNab |
| 7,301,731 B2 | 11/2007 | Mita et al. |
| 7,312,941 B2 * | 12/2007 | Hirano et al. .................. 360/31 |
| 7,345,851 B2 | 3/2008 | Hirano et al. |
| 7,352,538 B2 | 4/2008 | Kurihara et al. |
| 7,382,583 B2 | 6/2008 | Hirano et al. |
| 7,417,831 B2 | 8/2008 | Yao et al. |
| 7,420,785 B2 | 9/2008 | Yamazaki et al. |
| 7,466,520 B2 | 12/2008 | White et al. |
| 7,471,490 B2 | 12/2008 | Yao |
| 7,474,512 B2 | 1/2009 | Yao et al. |
| 7,535,680 B2 | 5/2009 | Yao et al. |
| 7,538,984 B2 | 5/2009 | Yao |
| 7,567,019 B2 | 7/2009 | Yamanaka et al. |
| 7,609,487 B2 | 10/2009 | Yao et al. |
| 7,663,843 B2 | 2/2010 | Yao |
| 7,684,158 B1 * | 3/2010 | Lauer .......................... 360/294.4 |
| 7,701,675 B2 | 4/2010 | Yao et al. |
| 7,719,798 B2 | 5/2010 | Yao |
| 7,733,607 B2 | 6/2010 | Yao et al. |
| 7,916,427 B1 * | 3/2011 | Lauer .......................... 360/294.4 |
| 8,015,692 B1 * | 9/2011 | Zhang et al. ................ 29/603.14 |
| 8,111,487 B2 * | 2/2012 | Lauer .......................... 360/294.4 |
| 8,264,797 | 9/2012 | Emley |
| 2002/0191342 A1 | 12/2002 | Yanagisawa |
| 2007/0291419 A1 | 12/2007 | Lee et al. |
| 2008/0024933 A1 | 1/2008 | Yao et al. |
| 2008/0198511 A1 | 8/2008 | Hirano et al. |
| 2009/0021857 A1 | 1/2009 | Shelor |
| 2011/0149439 A1 * | 6/2011 | Emley ......................... 360/245.3 |
| 2011/0176242 A1 * | 7/2011 | Lauer .......................... 360/294.4 |

OTHER PUBLICATIONS

Oldham et al., "Thin-Film PZT Lateral Actuators With Extended Stroke", Journal of Microelectromechanical Systems, vol. 17, No. 4, Aug. 2008, pp. 890-899.

Seo et al., "Laterally driven thin film PZT actuator with high-aspect-ratio silicon beam for stroke amplification", Sensors and Actuators A, vol. 127 (2006), pp. 302-309.

* cited by examiner

DISK DRIVE SUSPENSION ASSEMBLY WITH ROTARY FINE ACTUATOR AT FLEXURE TONGUE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a component of the suspension assembly. For example, the piezoelectric microactuator may be affixed to the mounting plate or an extension thereof, and/or the load beam or an extension thereof, or to the flexure tongue (a.k.a. the "gimbal tongue") to which the read head is bonded).

However, generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide. Hence there is a need in the information storage device arts for a microactuator design that can provide both adequate stroke and adequate bandwidth for fine actuation.

Moreover, certain prior art concepts in which the microactuator is disposed on the flexure tongue, have introduced excessive vertical offset (so-called "Z-offset") in the components. This may undesirably reduce the volumetric data density of the disk drive device. Also, certain prior art concepts in which the microactuator is disposed on the flexure tongue may undesirably cause a stick-slip phenomena to occur at a location of contact with the head loading dimple. This can adversely affect the performance and stroke of fine actuation. Hence, there is a need in the information storage device arts for a fine actuation/microactuator design that does not unacceptably increase Z-offset, and/or is not unacceptably degraded by stick-slip at the dimple location.

DETAILED DESCRIPTION OF EXEMPLARY EMBODIMENTS

Figure 1:
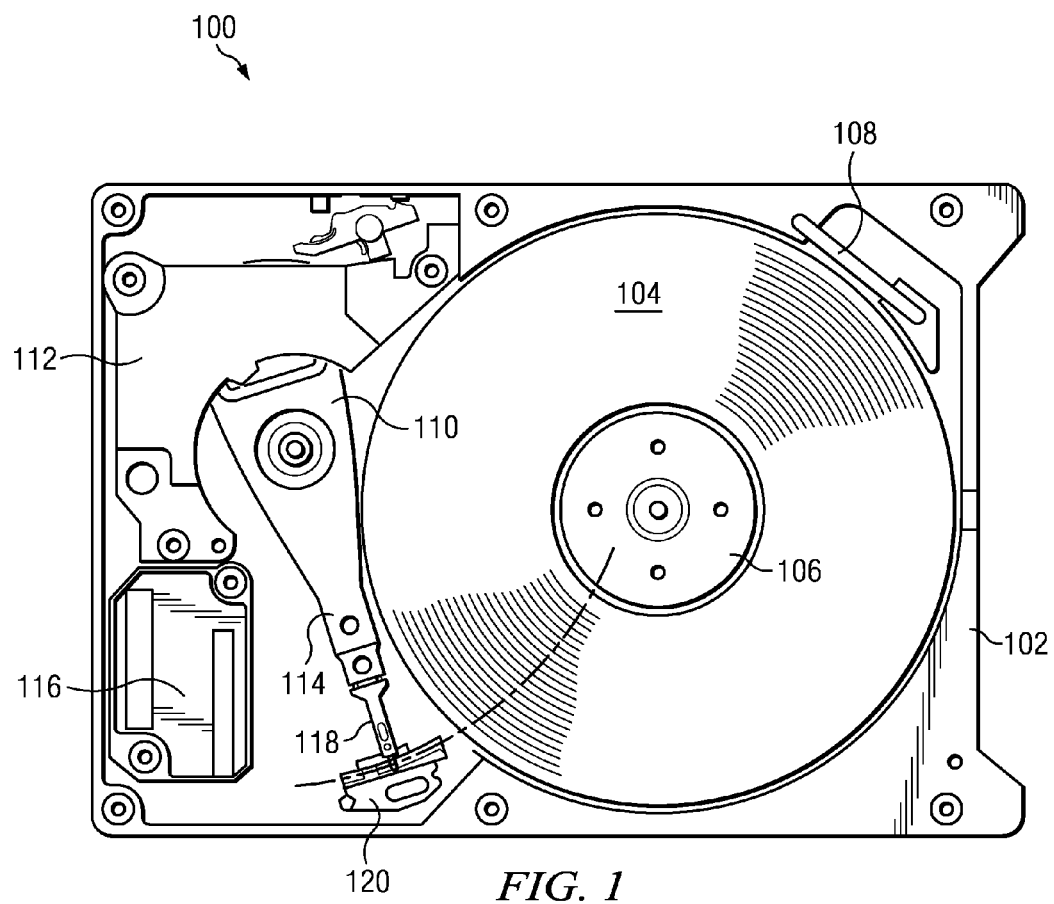
FIG. 1 is top view of a disk drive capable of including an embodiment of the present invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating at least one disk 104 that is mounted on the spindle 106. The rotation of the disk(s) 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Preferably the disk drive 100 will include one HGA 118 per disk surface, but depopulated disk drives are also contemplated in which fewer HGAs are used. Under non-operating conditions the HGAs may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2A:
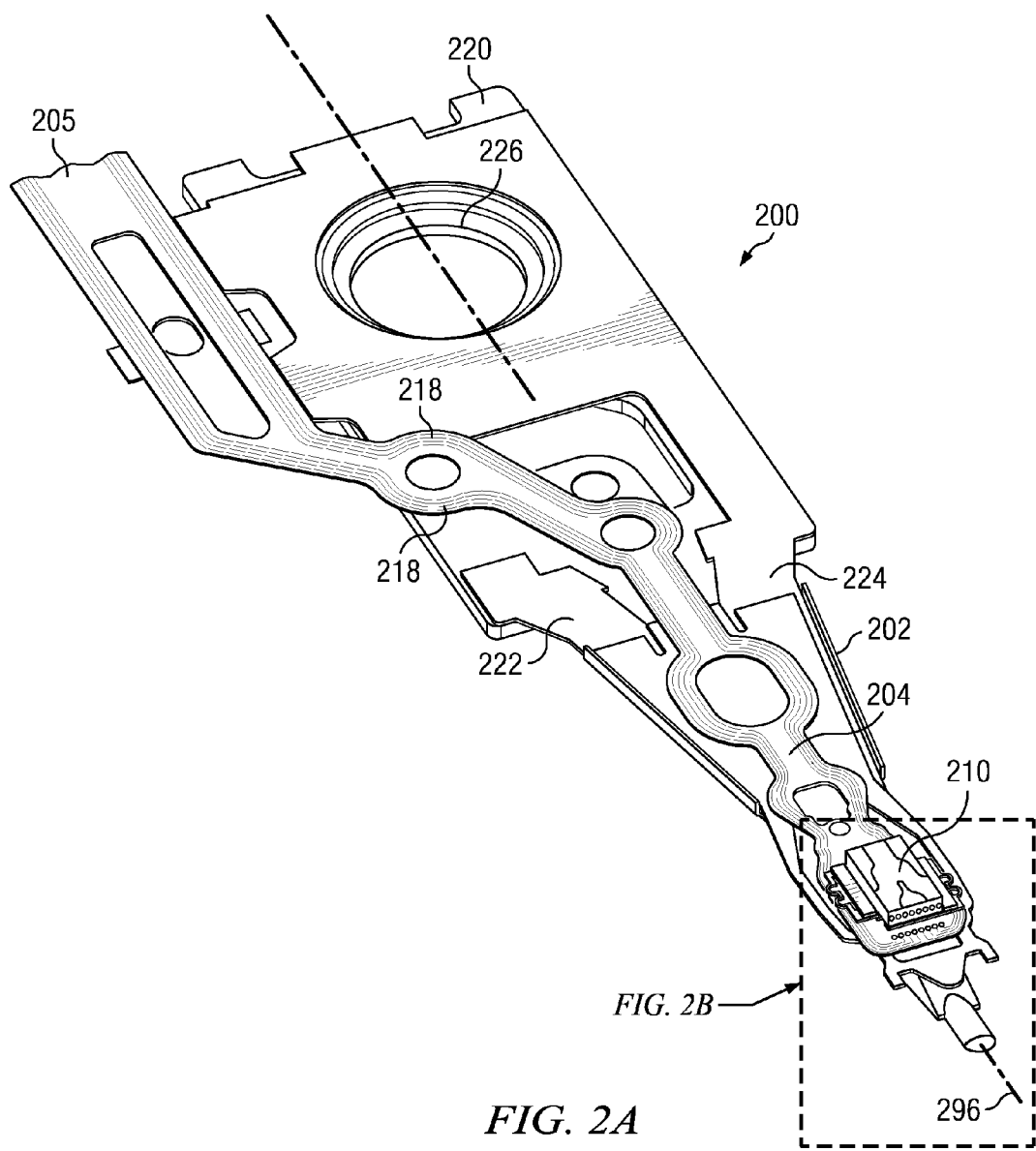
FIG. 2A is a bottom perspective view of a head gimbal assembly (HGA) according to an embodiment of the present invention.
Figure 2B:
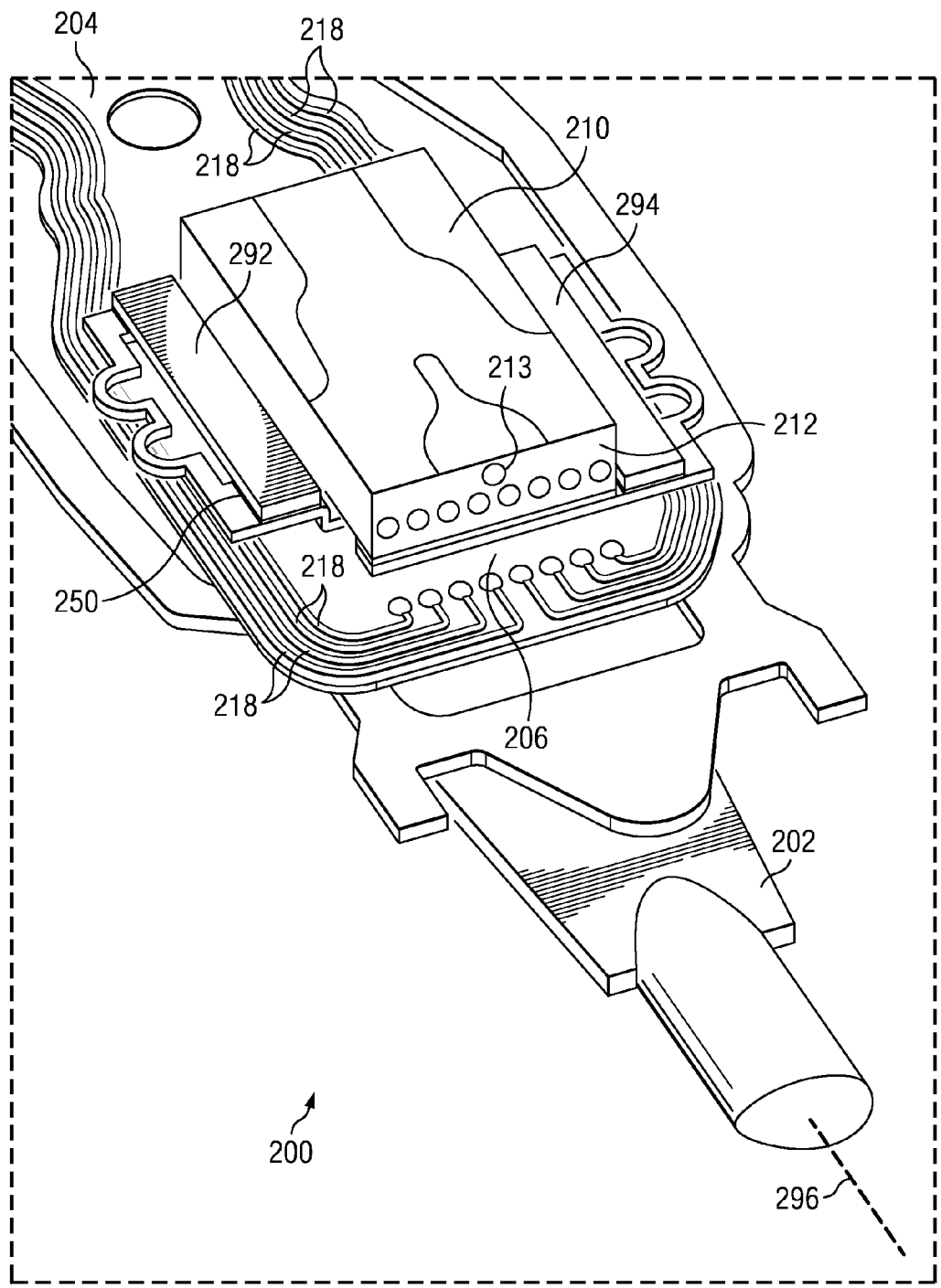
FIG. 2B is an expanded view of a portion of the HGA of FIG. 2A.

FIG. 2A is a bottom perspective view of an HGA 200 according to an embodiment of the present invention. FIG. 2B is an expanded view of a portion of the HGA 200. Now referring additionally to FIGS. 2A and 2B, the HGA 200 includes a load beam 202 that defines a load beam longitudinal axis 296, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer 213. In certain embodiments, the read/write transducer 213 is preferably an inductive magnetic write transducer merged with a magneto-resistive read transducer (e.g. a tunneling magneto-resistive read transducer). A purpose of the load beam 202 is to provide limited vertical compliance for the read head 210 to follow vertical undulations of the surface of a disk (e.g. disk 104) as it rotates, and to preload the air bearing surface of the read head 210 against the disk surface by a preload force that is commonly referred to as the "gram load."

In the embodiment of FIGS. 2A and 2B, the HGA 200 also includes a laminated flexure 204 attached to the load beam 202. The laminated flexure 204 includes a head mounting tongue 206 that has a read head bonding surface. The head 210 is attached to the head mounting tongue 206 of the laminated flexure 204. Only a portion of the head mounting tongue 206 is visible in the view of FIGS. 2A and 2B because the read head 210 (and other components of the HGA 200 that will be subsequently described) partially obscures it. A first purpose of the laminated flexure 204 is to provide compliance for the head 210 to follow pitch and roll angular undulations of the surface of the disk (e.g. disk 104) as it rotates, while restricting relative motion between the read head 210 and the load beam 202 in the lateral direction and about a yaw axis.

A second purpose of the laminated flexure 204 may be to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are insulated from a support layer (e.g. stainless steel) by a dielectric layer (e.g. polyimide). The electrically conductive traces 218 may extend away from the read head 210 along a flexure tail 205 of the laminated flexure 204, to reach a portion of the flex cable (not shown) that includes a preamplifier chip near the body of the actuator (e.g. actuator 110).

In the embodiment of FIGS. 2A and 2B, the load beam 202 includes hinge plates 222 and 224, and is attached to a mounting plate 220 via the hinge plates 222 and 224. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity.

The load beam 202 with its hinge plates 222, 224 (if any), and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes a swage boss 226 to facilitate attachment of the suspension assembly to an actuator arm (e.g. actuator arm 114). In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly." However, before the laminated flexure 204 is attached to the load beam 202, the term "suspension assembly" may refer to only the load beam 202 with its hinge plates 222, 224 (if any), and the mounting plate 220.

In the embodiment of FIGS. 2A and 2B, the HGA 200 is depicted to also include a rotary fine actuator 250 according to an embodiment of the present invention, attached to the head mounting tongue 206. The rotary fine actuator 250 may include first and second piezoelectric elements 292, 294. The read head 210 may be electrically connected to more than one of the plurality of conductive traces 218, and the first and second piezoelectric elements 292, 294 may be each electrically connected to at least one of the plurality of conductive traces 218.

Figure 3:
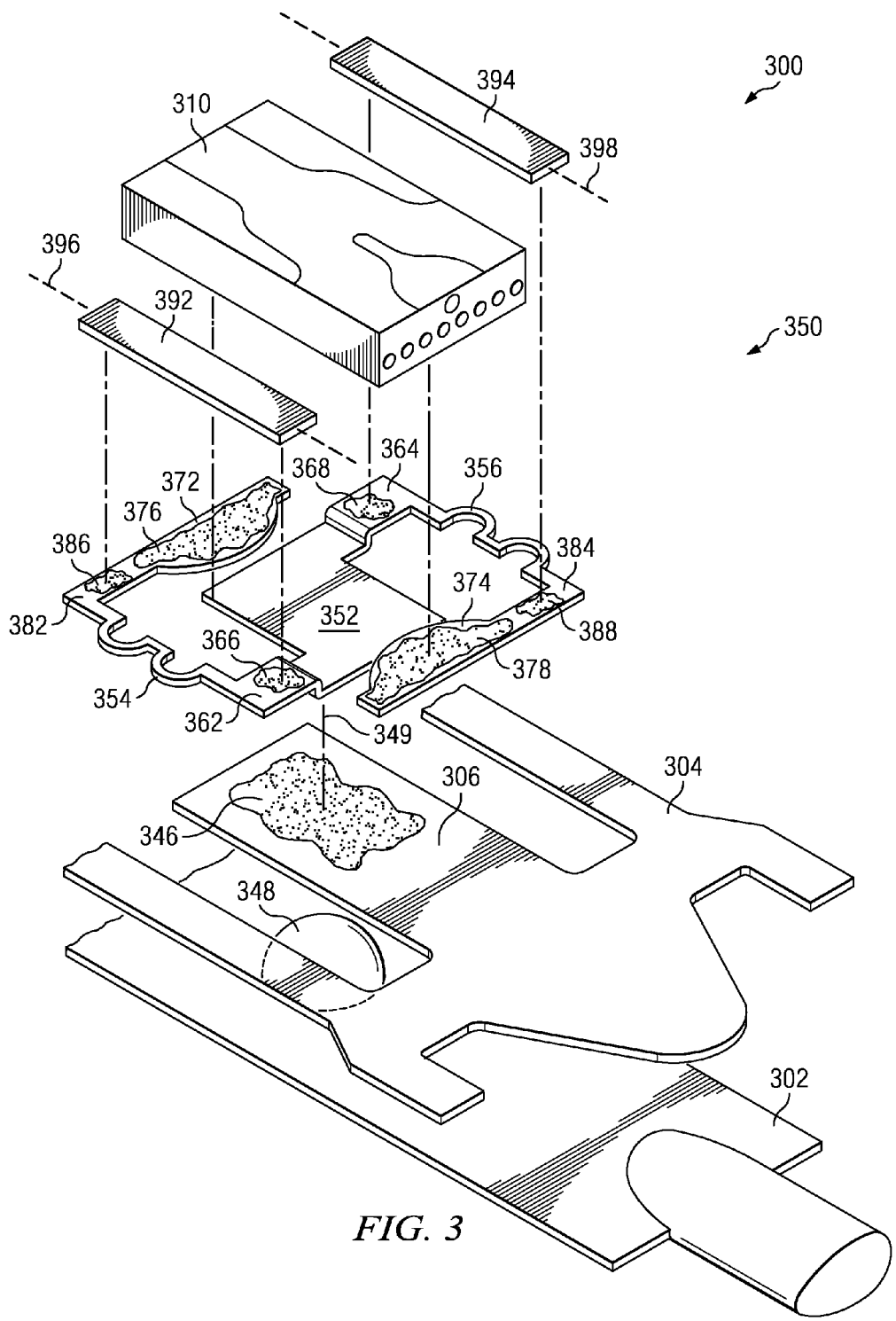
FIG. 3 is a bottom exploded perspective view of several rotary fine actuator components of an HGA according to an embodiment of the present invention.
Figure 4:
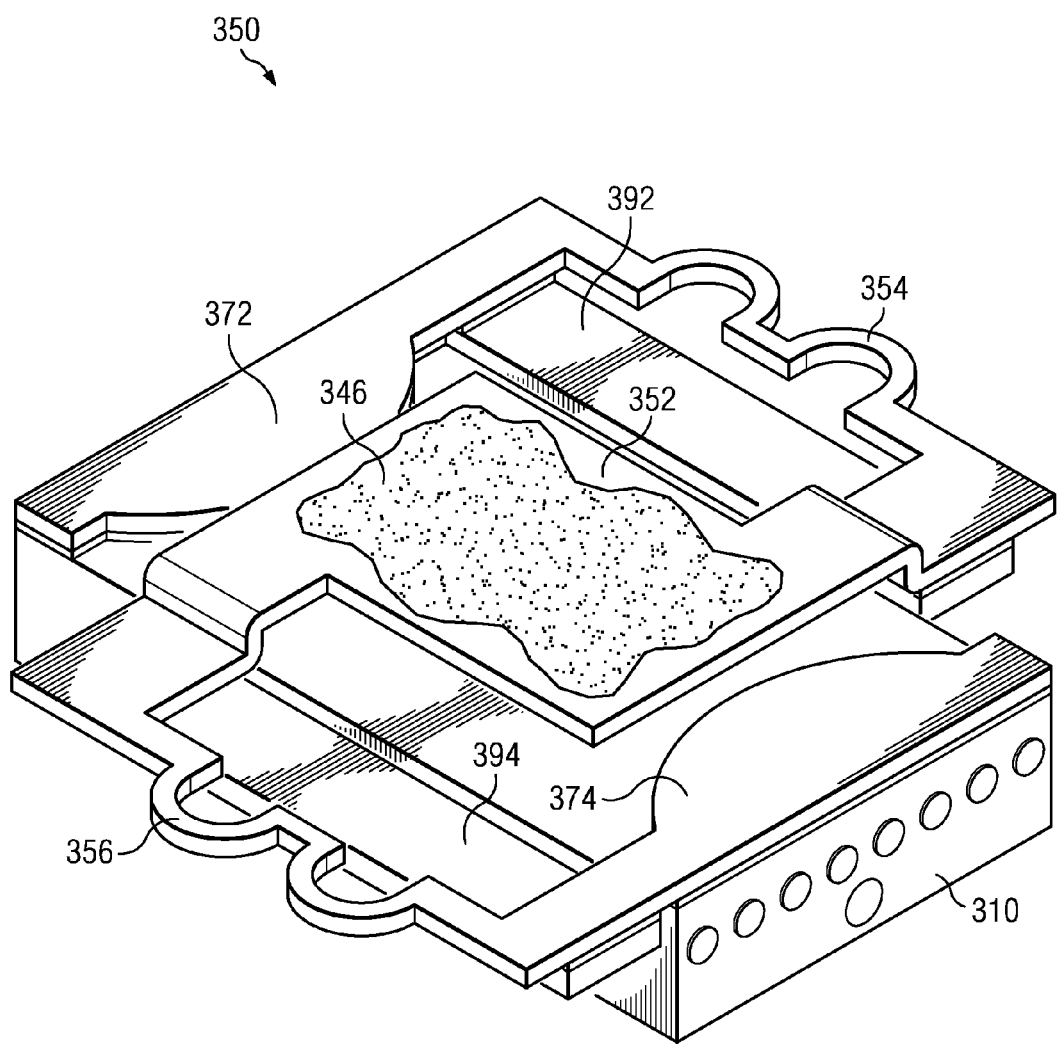
FIG. 4 is a top perspective assembled view of the rotary fine actuator components of FIG. 3.

FIG. 3 is a bottom exploded perspective view of several components of a rotary fine actuator 350 of an HGA 300 according to an embodiment of the present invention. FIG. 4 is a top perspective assembled view of those rotary fine actuator components. Now referring to FIGS. 3 and 4, the HGA 300 includes a load beam 302, and a laminated flexure 304 (only the structural layer of the flexure is shown in FIG. 3; the conventional dielectric layer, and the conventional traces of the conductive layer of the laminated flexure 304 are not shown, so that certain novel features of the rotary fine actuator 350 can be seen more clearly).

In the embodiment of FIGS. 3 and 4, the rotary fine actuator 350 of HGA 300 includes a fixed portion 352 having a first bonding surface 362, and a two-part head mounting platform 372, 374 that includes a second bonding surface 382. A read head 310 is adhered to the two-part head mounting platform by adhesive material 376, 378 (e.g. conventional epoxy, cyanoacrylate, etc). The rotary fine actuator 350 also includes a first piezoelectric element 392 defining a first element longitudinal axis 396 that is parallel to the load beam longitudinal axis (e.g. load beam longitudinal axis 296 of FIGS. 2A and 2B). Since perfect parallelism is not practical to achieve when fabricating such small structures, the term parallel, as used herein, shall mean within ±10 degrees of perfect parallelism.

Referring again to the embodiment of FIGS. 3 and 4, a first end of the first piezoelectric element 392 is bonded to the first bonding surface 362 by a bonding material 366. A second end of the first piezoelectric element 392 is bonded to the second bonding surface 382 by a bonding material 386. The rotary fine actuator 350 also includes a second piezoelectric element 394 extending between the fixed portion 352 and the two-part head mounting platform 372, 374. The second piezoelectric element 394 defines a second element longitudinal axis 398 that is parallel to the load beam longitudinal axis (e.g. load beam longitudinal axis 296 of FIGS. 2A and 2B).

Referring again to the embodiment of FIGS. 3 and 4, the fixed portion 352 may include a third bonding surface 364, and the two-part head mounting platform 372, 374 may include a fourth bonding surface 384. A first end of the second piezoelectric element 394 may be bonded to the third bonding surface 364 by a bonding material 368. A second end of the second piezoelectric element 394 may be bonded to the fourth bonding surface 384 by a bonding material 388. In certain embodiments, conductive adhesive, solder, ribbon leads, and/or gold wire stitching may be used to make conventional electrical connections to the piezoelectric elements 392, 394. However, if solder is used, then it may be desirable for the solder to be a low temp-melting-point since it should not need to get so hot that the piezoelectric material (e.g. PZT) is depolarized.

In certain embodiments, a side of each piezoelectric element 392, 394 may be grounded via electrical conduction through the head mounting platform 372, 374, the fixed portion 352, and the stainless steel parts of the suspension assembly (used as the ground conductor rather than or in addition to a ground trace of the laminated flexure). In certain embodiments, the head mounting platform 372, 374, and the fixed portion 352 are preferably fabricated from a metal material (e.g. stainless steel). The bonding materials 366, 368, 386, 388 may include conventional adhesive (e.g. UV cured epoxy, thermal set epoxy, epoxy doped with an electrically conductive filler, etc) or conventional solder materials, for example.

In the embodiment of FIGS. 3 and 4, the rotary fine actuator 350 includes a first curved compliant member 354 extending between the first bonding surface 362 of the fixed portion 352 and the second bonding surface 382 of the head mounting platform 372, 374. The rotary fine actuator 350 also includes a second curved compliant member 356 extending between the third bonding surface 364 of the fixed portion 352 and the fourth bonding surface 384 of the head mounting platform 372, 374. In certain embodiments, the curvature of the first and second compliant members 354, 356 may enhance their compliance for compression or elongation in a direction parallel to the element longitudinal axis 396.

In the embodiment of FIGS. 3 and 4, the fixed portion 352, the head mounting platform 372, 374, and the first and second curved compliant members 354, 356 are a single component having material continuity rather than being an assembly of sub-components. For example, the fixed portion 352, the head mounting platform 372, 374, and the first and second curved compliant members 354, 356 may be distinct regions of a single stainless steel sheet, each distinct region being at least partially bounded and defined by etched openings through the single stainless steel sheet. In the embodiment of FIGS. 3 and 4, such single component is bonded to the head mounting tongue 306 by a bonding material 346 (e.g. an adhesive such as an epoxy adhesive). The load beam 302 optionally includes a dimple 348 (e.g. a hemispherical dimple) that protrudes upwards towards the read head 310, and contacts the head mounting tongue 306 at a dimple contact location. The rotary fine actuator 350 preferably rotates the read head 310 about a fine actuator axis of rotation 349 that passes through the dimple contact location.

However, in an alternative embodiment, the fixed portion 352 is fabricated from the head mounting tongue 306 so that it is a region of the head mounting tongue 306. In that case, the head mounting tongue 306, the fixed portion 352, the head mounting platform 372, 374, and the first and second curved compliant members 354, 356 would be a single component having material continuity rather than being an assembly of sub-components. For example, the head mounting tongue 306, the fixed portion 352, the head mounting platform 372, 374, and the first and second curved compliant members 354, 356 may be distinct regions of a single stainless steel sheet, each distinct region being at least partially bounded and defined by etched openings through the single stainless steel sheet. In this alternative embodiment, the dimple 348 may contact the fixed portion 352, or pass through an opening in the fixed portion 352 to contact the read head 310 directly at a dimple contact location. Alignment of the fine actuator axis of rotation 349 with the dimple contact location may advantageously reduce or eliminate undesired stick-slip relative motion between the dimple 348 and rotating parts during operation.

In the embodiment of FIGS. 3 and 4, a read head 310 is bonded to the head mounting platform 372, 374, at mounting surfaces thereof that are parallel to the first, second, third, and fourth bonding surfaces 362, 382, 364, 384. Again in this context, since perfect parallelism is not practical to achieve when fabricating such small structures, the term "parallel" shall mean within ±5 degrees of perfect parallelism. As shown in FIG. 4, the read head 310 is disposed between the first and second piezoelectric elements 392, 394, and the first and second piezoelectric elements 392, 394 are disposed closer to the read head 310 than are the first and second curved compliant members 354, 356. For example, the first and second piezoelectric elements 392, 394 may be disposed between the first and second curved compliant members 354, 356, as viewed from above or below the HGA 300 along the fine actuator axis of rotation 349. Also, in the embodiment of FIGS. 3 and 4, the first and second piezoelectric elements 392, 394 are preferably disposed on the same side of a plane that passes through the mounting surfaces of the head mounting platform 372, 374, as is the read head 310.

Figure 5:
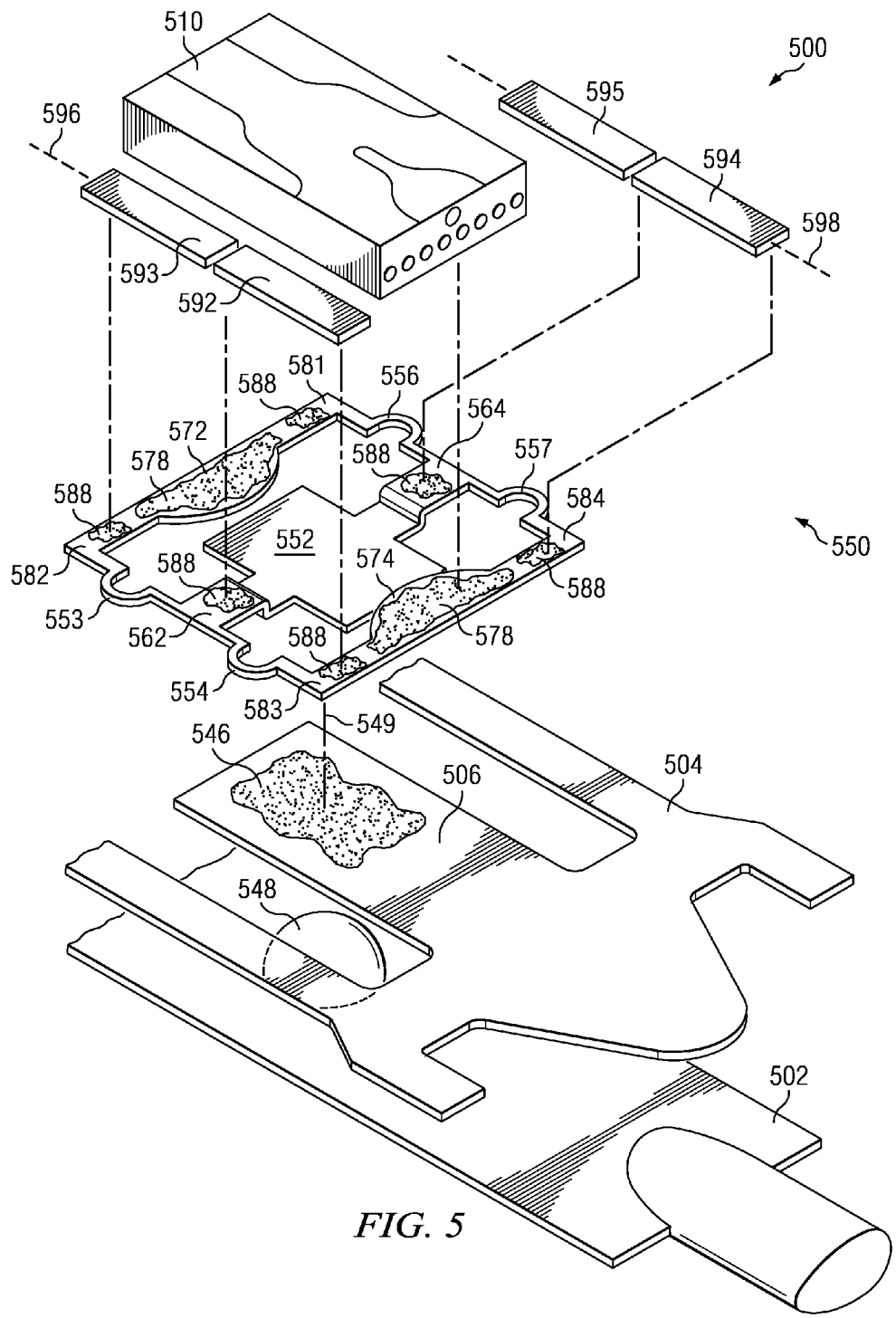
FIG. 5 is a bottom exploded perspective view of several rotary fine actuator components of an HGA according to an embodiment of the present invention.
Figure 6:
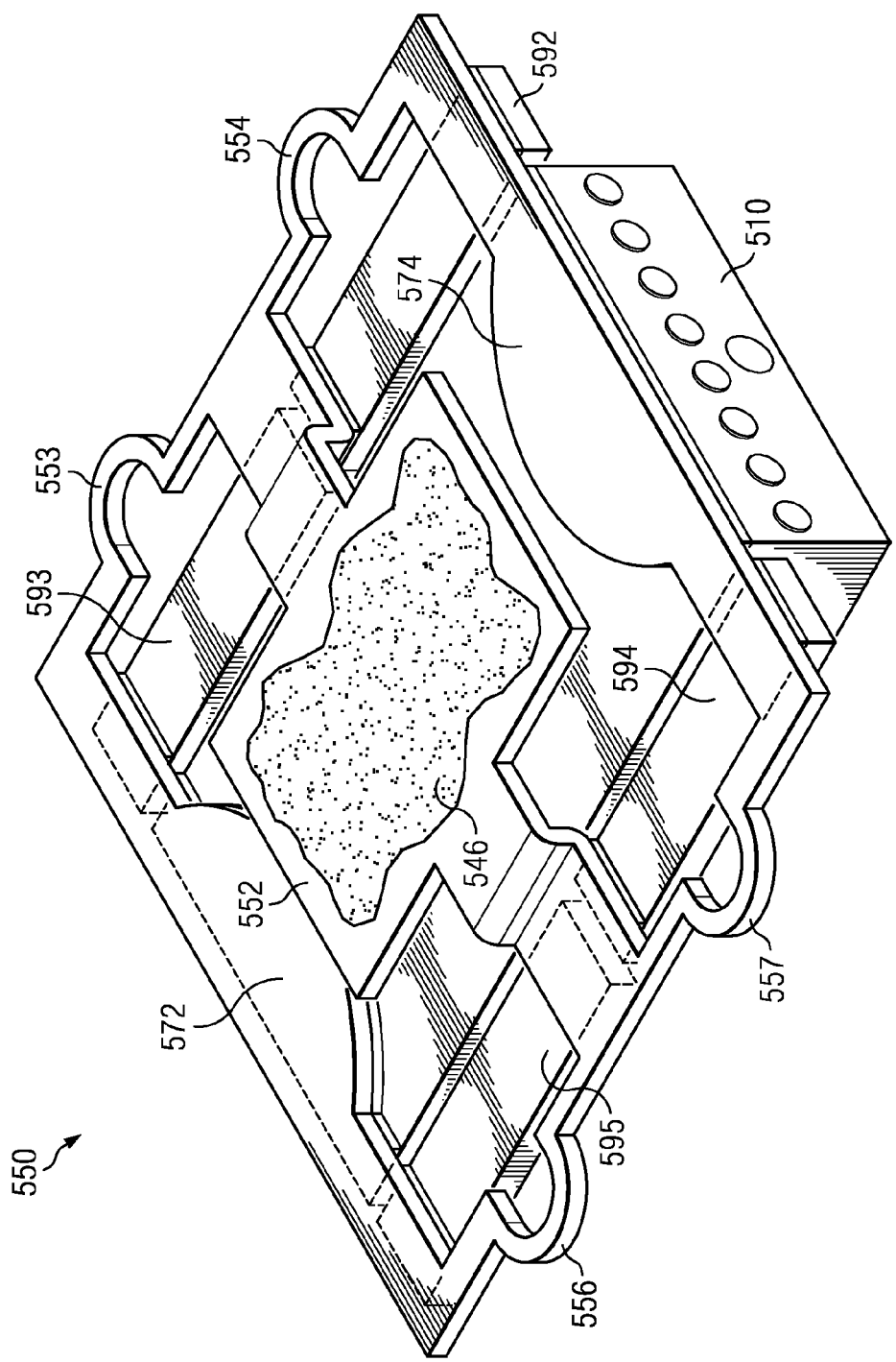
FIG. 6 is a top perspective assembled view of the rotary fine actuator components of FIG. 5.

FIG. 5 is a bottom exploded perspective view of several components of a rotary fine actuator 550 of an HGA 500 according to an embodiment of the present invention. FIG. 6 is a top perspective assembled view of those rotary fine actuator components. Now referring to FIGS. 5 and 6, the HGA 500 includes a load beam 502, and a laminated flexure 504 (only the structural layer of the flexure is shown in FIG. 5; the conventional dielectric layer, and the conventional traces of the conductive layer of the laminated flexure 504 are not shown, so that certain novel features of the rotary fine actuator 550 can be seen more clearly).

In the embodiment of FIGS. 5 and 6, the rotary fine actuator 550 of HGA 500 includes a fixed portion 552 having a first bonding surface 562, and a two-part head mounting platform 572, 574 that includes a second bonding surface 582. A read head 510 is adhered to the two-part head mounting platform by adhesive material 578 (e.g. conventional epoxy, cyanoacrylate, etc). The rotary fine actuator 550 also includes a first piezoelectric element 593 defining a first element longitudinal axis 596 that is parallel to the load beam longitudinal axis (e.g. load beam longitudinal axis 296 of FIGS. 2A and 2B). Since perfect parallelism is not practical to achieve when fabricating such small structures, the term parallel, as used herein, shall mean within ±10 degrees of perfect parallelism.

Referring again to the embodiment of FIGS. 5 and 6, a first end of the first piezoelectric element 593 is bonded to the first bonding surface 562 by a bonding material 588. A second end of the first piezoelectric element 593 is bonded to the second bonding surface 582 by the bonding material 588. The rotary fine actuator 550 also includes a second piezoelectric element 594 extending between the fixed portion 552 and the two-part head mounting platform 572, 574. The second piezoelectric element 594 defines a second element longitudinal axis 598 that is parallel to the load beam longitudinal axis (e.g. load beam longitudinal axis 296 of FIGS. 2A and 2B).

Referring again to the embodiment of FIGS. 5 and 6, the fixed portion 552 may include a third bonding surface 564, and the two-part head mounting platform 572, 574 may include a fourth bonding surface 584. A first end of the second piezoelectric element 594 may be bonded to the third bonding surface 564 by the bonding material 588. A second end of the second piezoelectric element 594 may be bonded to the fourth bonding surface 584 by the bonding material 588.

Referring again to the embodiment of FIGS. 5 and 6, the two-part head mounting platform 572, 574 may include a fifth bonding surface 581 and a sixth bonding surface 583. A first end of a third piezoelectric element 595 may be bonded to the third bonding surface 564 by the bonding material 588. A second end of the third piezoelectric element 595 may be bonded to the fifth bonding surface 581 by the bonding material 588. A first end of a fourth piezoelectric element 592 may be bonded to the first bonding surface 562 by the bonding material 588. A second end of the fourth piezoelectric element 592 may be bonded to the sixth bonding surface 583 by the bonding material 588.

In certain embodiments, conductive adhesive, solder, ribbon leads, and/or gold wire stitching may be used to make conventional electrical connections to the piezoelectric elements 592, 593, 594, and 595. However, if solder is used, then it may be desirable for the solder to be a low temp-melting-point since it should not need to get so hot that the piezoelectric material (e.g. PZT) is depolarized.

In certain embodiments, a side of each piezoelectric element 592, 593, 594, 595 may be grounded via electrical conduction through the head mounting platform 572, 574, the fixed portion 552, and the stainless steel parts of the suspension assembly (used as the ground conductor rather than or in addition to a ground trace of the laminated flexure). In certain embodiments, the head mounting platform 572, 574, and the fixed portion 552 are preferably fabricated from a metal material (e.g. stainless steel). The bonding material 588 may include conventional adhesive (e.g. UV cured epoxy, thermal set epoxy, epoxy doped with an electrically conductive filler, etc) or conventional solder materials, for example.

In the embodiment of FIGS. 5 and 6, piezoelectric elements 592 and 593 are shown to be physically separate ceramic blocks. However, in an alternative embodiment, piezoelectric elements 592 and 593 could be oppositely polarized regions of a single ceramic block. Likewise, piezoelectric elements 594 and 595 could be oppositely polarized regions of a single ceramic block. Such oppositely polarized regions would still be considered as different and separate piezoelectric elements in the context of the embodiment of FIGS. 5 and 6. Creating piezoelectric elements 592 and 593 as oppositely polarized regions of a single ceramic block, rather than as separate ceramic blocks, may have an advantage in ease of assembly, since all the parts shown in FIGS. 5 and 6 are very small and therefore can be difficult to position and handle without damage during assembly.

In the embodiment of FIGS. 5 and 6, the rotary fine actuator 550 includes a first curved compliant member 553 extending between the first bonding surface 562 of the fixed portion 552 and the second bonding surface 582 of the head mounting platform 572, 574. The rotary fine actuator 350 also includes a second curved compliant member 557 extending between the third bonding surface 564 of the fixed portion 552 and the fourth bonding surface 584 of the head mounting platform 572, 574.

In the embodiment of FIGS. 5 and 6, the rotary fine actuator 350 also includes a third curved compliant member 556 extending between the third bonding surface 564 of the fixed portion 552 and the fifth bonding surface 581 of the head mounting platform 572, 574. The rotary fine actuator 350 also includes a fourth curved compliant member 554 extending between the first bonding surface 562 of the fixed portion 552 and the sixth bonding surface 583 of the head mounting platform 572, 574. In certain embodiments, the curvature of the curved compliant members 553, 554 may enhance their compliance for compression or elongation in a direction parallel to the element longitudinal axis 596, and the curvature of the curved compliant members 556, 557 may enhance their compliance for compression or elongation in a direction parallel to the element longitudinal axis 598.

In the embodiment of FIGS. 5 and 6, the fixed portion 552, the head mounting platform 572, 574, and the curved compliant members 553, 554, 556, 557 are a single component having material continuity rather than being an assembly of sub-components. For example, the fixed portion 552, the head mounting platform 572, 574, and the curved compliant members 553, 554, 556, 557 may be distinct regions of a single stainless steel sheet, each distinct region being at least partially bounded and defined by etched openings through the single stainless steel sheet. In the embodiment of FIGS. 5 and 6, such single component is bonded to the head mounting tongue 506 by a bonding material 546 (e.g. an adhesive such as an epoxy adhesive). The load beam 502 optionally includes a dimple 548 (e.g. a hemispherical dimple) that protrudes upwards towards the read head 510, and contacts the head mounting tongue 506 at a dimple contact location. The rotary fine actuator 550 preferably rotates the read head 510 about a fine actuator axis of rotation 549 that passes through the dimple contact location.

However, in an alternative embodiment, the fixed portion 552 is fabricated from the head mounting tongue 506 so that it is a region of the head mounting tongue 506. In that case, the head mounting tongue 506, the fixed portion 552, the head mounting platform 572, 574, and the curved compliant members 553, 554, 556, 557 would be a single component having material continuity rather than being an assembly of sub-components. For example, the head mounting tongue 506, the fixed portion 552, the head mounting platform 572, 574, and the curved compliant members 553, 554, 556, 557 may be distinct regions of a single stainless steel sheet, each distinct region being at least partially bounded and defined by etched openings through the single stainless steel sheet. In this alternative embodiment, the dimple 548 may contact the fixed portion 552, or pass through an opening in the fixed portion 552 to contact the read head 510 directly at a dimple contact location. Alignment of the fine actuator axis of rotation 549 with the dimple contact location may advantageously reduce or eliminate undesired stick-slip relative motion between the dimple 548 and rotating parts during operation.

In the embodiment of FIGS. 5 and 6, a read head 510 is bonded to the head mounting platform 572, 574, at mounting surfaces thereof that are parallel to the first through sixth bonding surfaces 562, 582, 564, 584, 581, 583. Again in this context, since perfect parallelism is not practical to achieve when fabricating such small structures, the term "parallel" shall mean within ±5 degrees of perfect parallelism. As shown in FIG. 6, the read head 510 is disposed between the first and second piezoelectric elements 593, 594, and between the third and fourth piezoelectric elements 595, 592. Also, in the embodiment of FIGS. 5 and 6, the piezoelectric elements 592, 593, 594, 595 are preferably disposed on the same side of a plane that passes through the mounting surfaces of the head mounting platform 572, 574, as is the read head 510.

In the embodiment of FIGS. 5 and 6, the piezoelectric elements 592, 593, 594, 595 may preferably be disposed closer to the read head 510 than are the curved compliant members 553, 554, 556, 557. For example, the first and third piezoelectric elements 593, 595 may be disposed between the first and third curved compliant members 553, 556, as viewed from above or below the HGA 500 along the fine actuator axis of rotation 549. Also for example, the second and fourth piezoelectric elements 594, 592 may be disposed between the second and fourth curved compliant members 557, 554, as viewed from above or below the HGA 500 along the fine actuator axis of rotation 549.

Figure 7:
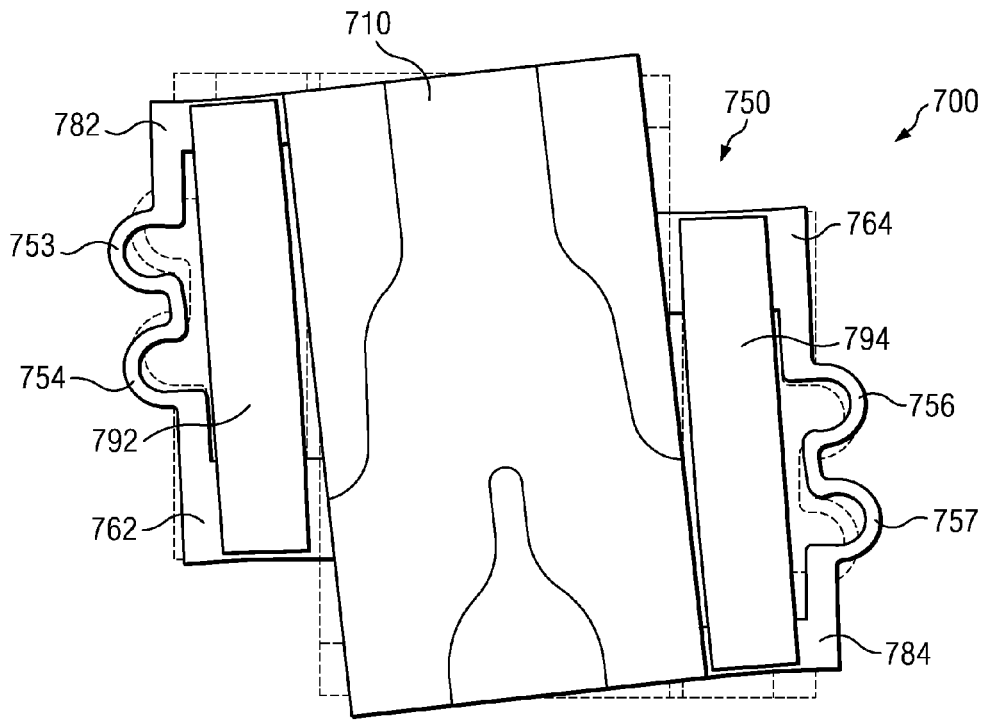
FIG. 7 is a bottom view of a portion of HGA according to an embodiment of the present invention, during operation of the rotary fine actuator, with angular deflection exaggerated for clarity.

FIG. 7 is a bottom view of a portion of an HGA 700 according to an embodiment of the present invention, during operation of its rotary fine actuator 750, with angular deflection exaggerated for clarity. In the embodiment of FIG. 7, first and second bonding surfaces 762, 764 of a fixed portion of the rotary fine actuator 750 are held substantially stationary as first and second piezoelectric elements 792, 794 are each caused to contract by an applied electric field (e.g. by applying an electrical potential across conventional electrodes). Such contraction compresses the curved compliant members 753, 754, 756, 757, so that the first and second bonding surfaces 782, 784 of a head mounting platform of rotary fine actuator 750 rotate counter-clockwise in the view of FIG. 7 (thereby rotating the read head 710 counter-clockwise). Applied electric fields of opposite sense would expand the first and second piezoelectric elements 792, 794, stretching the curved compliant members 753, 754, 756, 757, so that the first and second bonding surfaces 782, 784 of the head mounting platform of rotary fine actuator 750 would rotate clockwise in the view of FIG. 7 (thereby rotating the read head 710 clockwise).

Figure 8:
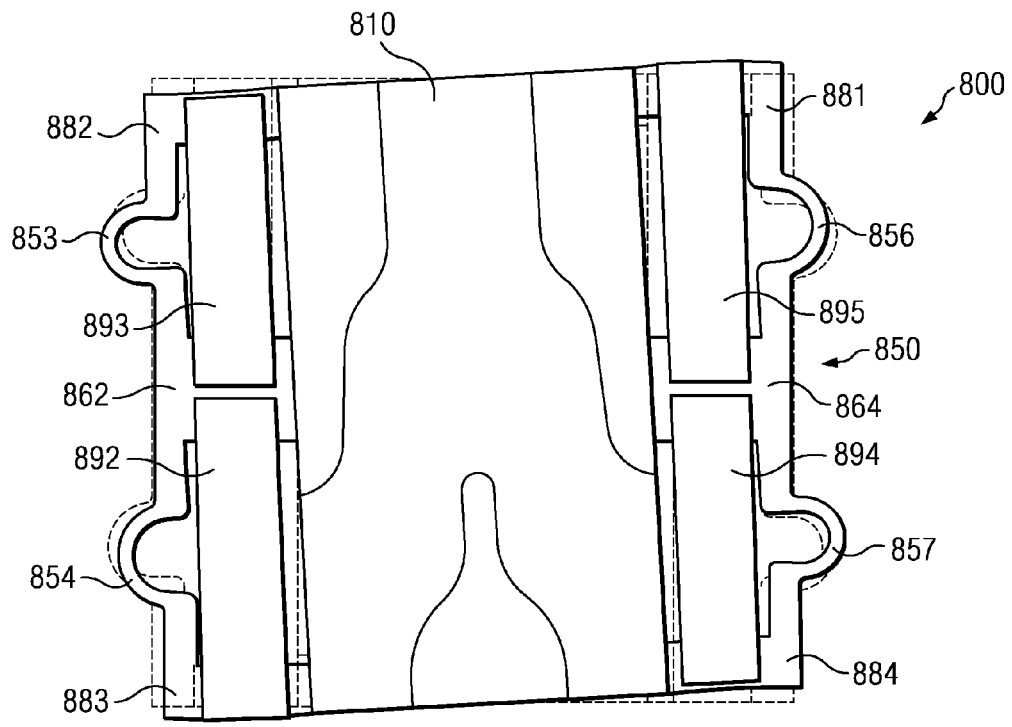
FIG. 8 is a bottom view of a portion of HGA according to another embodiment of the present invention, during operation of the rotary fine actuator, with angular deflection exaggerated for clarity.

FIG. 8 is a bottom view of a portion of HGA 800 according to another embodiment of the present invention, during operation of its rotary fine actuator 850, with angular deflection exaggerated for clarity. In the embodiment of FIG. 8, first and second bonding surfaces 862, 864 of a fixed portion of the rotary fine actuator 850 are held substantially stationary as an electric field is applied to piezoelectric elements 892, 893, 894, 895 (e.g. by applying an electrical potential across conventional electrodes). Specifically, piezoelectric elements 893 and 894 are caused to contract by applied electric fields, while piezoelectric elements 892 and 895 are caused to expand by applied electric fields. Such contraction and expansion, compresses the curved compliant members 853, 857, and stretches the curved compliant members 854, 856, respectively. This causes the bonding surfaces 881, 882, 883, 884 of a head mounting platform of rotary fine actuator 850 to rotate counter-clockwise in the view of FIG. 8 (thereby rotating the read head 810 counter-clockwise).

In the embodiment of FIG. 8, applied electric fields of opposite sense would cause piezoelectric elements 893 and 894 to expand, while piezoelectric elements 892 and 895 would contract. Such expansion and contraction, would stretch the curved compliant members 853, 857, and compress the curved compliant members 854, 856, respectively. This would cause the bonding surfaces 881, 882, 883, 884 of a head mounting platform of rotary fine actuator 850 to rotate clockwise in the view of FIG. 8 (thereby rotating the read head 810 clockwise).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head gimbal assembly (HGA) comprising:
a suspension assembly, the suspension assembly including
a suspension assembly mounting plate;
a load beam extending from the suspension assembly mounting plate and defining a load beam longitudinal axis;
a laminated flexure attached to the load beam, the laminated flexure including a head mounting tongue, and
a rotary fine actuator attached to the head mounting tongue, the rotary fine actuator comprising
a fixed portion having a first bonding surface,
a head mounting platform having a second bonding surface,
a first piezoelectric element defining a first element longitudinal axis that is parallel to the load beam longitudinal axis, the first piezoelectric element being bonded to the first and second bonding surfaces;
a second piezoelectric element extending between the fixed portion and the head mounting platform;
first and second curved compliant members extending between the fixed portion and the head mounting platform; and
a read head bonded to a mounting surface of the head mounting platform, the first and second bonding surfaces being parallel to the mounting surface, the read head being disposed between the first and second piezoelectric elements.

2. The HGA of claim 1 wherein the load beam includes a dimple in contact with the head mounting tongue at a dimple contact location.

3. The HGA of claim 2 wherein the rotary fine actuator defines an axis of rotation that passes through the dimple contact location.

4. The HGA of claim 1 wherein the head mounting tongue, the fixed portion, the head mounting platform, and the first and second curved compliant members are a single component having material continuity rather than being an assembly of sub-components.

5. The HGA of claim 4 wherein the head mounting tongue, the fixed portion, the head mounting platform, and the first and second curved compliant members are distinct regions of a single stainless steel sheet, each distinct region being at least partially bounded and defined by etched openings through the single stainless steel sheet.

6. The HGA of claim 1 wherein the mounting surface defines a mounting plane, and wherein the first and second piezoelectric elements are disposed on the same side of the mounting plane as is the read head.

7. The HGA of claim 1 wherein the laminated flexure includes a structural layer, a dielectric layer, and a conductive layer that defines a plurality of conductive traces, and wherein the read head is electrically connected to more than one of the plurality of conductive traces, and the first and second piezoelectric elements are each electrically connected to at least one of the plurality of conductive traces.

8. The HGA of claim 1 wherein the first and second piezoelectric elements are disposed closer to the read head than are the first and second curved compliant members.

9. The HGA of claim 1 further comprising third and fourth piezoelectric elements extending between the fixed portion and the head mounting platform.

10. The HGA of claim 1 further comprising third and fourth curved compliant members extending between the fixed portion and the head mounting platform.

11. The disk drive of claim 1 wherein the first and second piezoelectric elements are disposed closer to the read head than are the first and second curved compliant members.

12. A disk drive comprising:
a disk drive base;
a spindle attached to the disk drive base;
a disk mounted on the spindle;
a coarse actuator pivotally attached to the disk drive base and defining a coarse actuator pivot axis, the coarse actuator including an actuator arm that defines an arm longitudinal axis that is normal to the coarse actuator pivot axis;
a suspension assembly, the suspension assembly including
a suspension assembly mounting plate attached to the actuator arm;
a load beam extending from the suspension assembly mounting plate;
a laminated flexure attached to the load beam, the laminated flexure including a head mounting tongue, and
a rotary fine actuator attached to the head mounting tongue, the rotary fine actuator comprising
a fixed portion having a first bonding surface,
a head mounting platform having a second bonding surface,
a first piezoelectric element defining a first element longitudinal axis that is parallel to the load beam longitudinal axis, the first piezoelectric element being bonded to the first and second bonding surfaces;
a second piezoelectric element extending between the fixed portion and the head mounting platform;
first and second curved compliant members extending between the fixed portion and the head mounting platform; and
a read head bonded to a mounting surface of the head mounting platform, the first and second bonding surfaces being parallel to the mounting surface, and the read head being disposed between the first and second piezoelectric elements.

13. The disk drive of claim 12 wherein the load beam includes a dimple in contact with the head mounting tongue at a dimple contact location.

14. The disk drive of claim 13 wherein the rotary fine actuator defines an axis of rotation that passes through the dimple contact location.

15. The disk drive of claim 12 wherein the head mounting tongue, the fixed portion, the head mounting platform, and the first and second curved compliant members are a single component having material continuity rather than being an assembly of sub-components.

16. The disk drive of claim 15 wherein the head mounting tongue, the fixed portion, the head mounting platform, and the first and second curved compliant members are distinct regions of a single stainless steel sheet, each distinct region being at least partially bounded and defined by etched openings through the single stainless steel sheet.

17. The disk drive of claim 12 wherein the mounting surface defines a mounting plane, and wherein the first and second piezoelectric elements are disposed on the same side of the mounting plane as is the read head.

18. The disk drive of claim 12 wherein the laminated flexure includes a structural layer, a dielectric layer, and a conductive layer that defines a plurality of conductive traces, and wherein the read head is electrically connected to more than one of the plurality of conductive traces, and the first and second piezoelectric elements are each electrically connected to at least one of the plurality of conductive traces.

19. The disk drive of claim 18 further comprising third and fourth piezoelectric elements extending between the fixed portion and the head mounting platform.

20. The disk drive of claim 18 further comprising third and fourth curved compliant members extending between the fixed portion and the head mounting platform.

* * * * *